(12) United States Patent
Nunnink (10) Patent No.: US 10,830,927 B2
(45) Date of Patent: Nov. 10, 2020

(54) SYSTEM AND METHOD FOR REDUCTION OF DRIFT IN A VISION SYSTEM VARIABLE LENS

(71) Applicant: Cognex Corporation, Natick, MA (US)

(72) Inventor: Laurens Nunnink, Simpleveld (NL)

(73) Assignee: Cognex Corporation, Natick, MA (US)

( * ) Notice: Subject to any disclaimer, the term of this patent is extended or adjusted under 35 U.S.C. 154(b) by 488 days.

(21) Appl. No.: 14/271,148

(22) Filed: May 6, 2014

(65) Prior Publication Data
US 2015/0323709 A1 Nov. 12, 2015

(51) Int. Cl.
*G02B 3/14* (2006.01)
*G02B 7/14* (2006.01)
(Continued)

(52) U.S. Cl.
CPC ............. *G02B 3/14* (2013.01); *G02B 7/04* (2013.01); *G02B 7/14* (2013.01); *G03B 3/10* (2013.01);
(Continued)

(58) Field of Classification Search
CPC ........ G02B 3/12; G02B 3/14; G02B 27/0025; G02B 27/0955; G02B 13/24; G02B 5/005;
(Continued)

(56) References Cited

U.S. PATENT DOCUMENTS 5,973,852 A * 10/1999 Task .................. G02B 3/14
359/665
6,081,388 A * 6/2000 Widl .................. G02B 3/0081
359/665

(Continued)

FOREIGN PATENT DOCUMENTS

EP 1583354 10/2005
EP 1837689 9/2007
(Continued)

OTHER PUBLICATIONS

Nunnink, et al., "U.S. Appl. No. 13/800,055, filed Mar. 13, 2013, Lens Assembly With Integrated Feedback Loop for Focus Adjustment", Mar. 13, 2013.
(Continued)

*Primary Examiner* — Twyler L Haskins
*Assistant Examiner* — Akshay Trehan
(74) *Attorney, Agent, or Firm* — Loginov & Associates, PLLC; William A. Loginov (57) ABSTRACT

This invention provides a vision system that is arranged to compensate for optical drift that can occur in certain variable lens assemblies, including, but not limited to, liquid lens arrangements. The system includes an image sensor operatively connected to a vision system processor, and a variable lens assembly that is controlled (e.g. by the vision processor or another range-determining device) to vary a focal distance thereof. A positive lens assembly is configured to weaken an effect of the variable lens assembly over a predetermined operational range of the object from the positive lens assembly. The variable lens assembly is located adjacent to a front or rear focal point of the positive lens. The variable lens assembly illustratively comprises a liquid lens assembly that can be inherently variable over approximately 20 diopter. In an embodiment, the lens barrel has a C-mount lens base.

18 Claims, 9 Drawing Sheets

(51) Int. Cl.
  *G02B 7/04* (2006.01)
  *H04N 5/225* (2006.01)
  *H04N 5/232* (2006.01)
  *G03B 3/10* (2006.01)
  *G06K 7/10* (2006.01)
  *G06K 7/14* (2006.01)

(52) U.S. Cl.
  CPC ..... *G06K 7/10544* (2013.01); *G06K 7/10831* (2013.01); *G06K 7/14* (2013.01); *H04N 5/2253* (2013.01); *H04N 5/2254* (2013.01); *H04N 5/23212* (2013.01)

(58) Field of Classification Search
  CPC .... G02B 7/021; G02B 15/14; H04N 5/23212; H04N 5/2254; G06K 7/10544; G06K 7/14; G06K 7/10831; G06K 7/10821; G06K 7/1439
  USPC .................. 359/226.3, 228, 665; 396/79, 89
  See application file for complete search history.

(56) References Cited

U.S. PATENT DOCUMENTS

| | | | |
|---|---|---|---|
| 6,188,526 B1 | 2/2001 | Sasaya | |
| 6,344,930 B1 | 2/2002 | Kaneko | |
| 6,898,021 B1* | 5/2005 | Tang | G02B 3/14 349/200 |
| 7,296,746 B2 | 11/2007 | Philyaw | |
| 7,296,749 B2 | 11/2007 | Massieu | |
| 7,382,545 B2 | 6/2008 | Jung | |
| 7,436,587 B2* | 10/2008 | Feldman | G02B 3/14 359/349 |
| 7,453,646 B2 | 11/2008 | Lo | |
| 7,466,493 B2 | 12/2008 | Kim et al. | |
| 7,710,535 B2 | 5/2010 | Nomura | |
| 7,742,075 B2 | 6/2010 | Kimura | |
| 7,755,841 B2* | 7/2010 | Christenson | B29D 11/00028 264/1.7 |
| 7,855,838 B2 | 12/2010 | Jannard et al. | |
| 8,027,095 B2* | 9/2011 | Havens | G06K 7/10702 359/665 |
| 8,072,689 B2 | 12/2011 | Bolis | |
| 8,154,805 B2 | 4/2012 | Jannard et al. | |
| 8,169,709 B2 | 5/2012 | Jannard et al. | |
| 8,203,628 B2 | 6/2012 | Honjo | |
| 8,284,275 B2 | 10/2012 | Abe | |
| 8,363,149 B2 | 1/2013 | Yumiki | |
| 8,472,122 B2 | 6/2013 | Obu et al. | |
| 8,545,555 B2 | 10/2013 | Berge | |
| 8,576,390 B1 | 11/2013 | Nunnink | |
| 8,794,521 B2* | 8/2014 | Joussen | G06K 7/1404 235/454 |
| 2003/0095238 A1* | 5/2003 | Imafuku | G02B 13/08 353/69 |
| 2004/0228003 A1 | 11/2004 | Takeyama et al. | |
| 2006/0047039 A1* | 3/2006 | Kato | G02B 3/14 524/342 |
| 2006/0257142 A1 | 11/2006 | Tanaka | |
| 2007/0170259 A1 | 7/2007 | Nunnink | |
| 2007/0216851 A1 | 9/2007 | Matsumoto | |
| 2008/0055425 A1* | 3/2008 | Kuiper | G01C 3/32 348/222.1 |
| 2008/0062529 A1* | 3/2008 | Helwegen | G02B 3/14 359/665 |
| 2008/0231966 A1* | 9/2008 | Hendriks | G02B 3/14 359/666 |
| 2008/0277477 A1 | 11/2008 | Thuries | |
| 2008/0277480 A1* | 11/2008 | Thuries | G02B 3/14 235/472.01 |
| 2009/0072037 A1* | 3/2009 | Good | G02B 3/14 235/462.35 |
| 2009/0141365 A1 | 6/2009 | Jannard et al. | |
| 2009/0302197 A1* | 12/2009 | Uchino | H04N 5/2254 250/201.4 |
| 2010/0039709 A1* | 2/2010 | Lo | G02B 3/14 359/665 |
| 2010/0231783 A1* | 9/2010 | Bueler | G02B 3/14 348/347 |
| 2010/0243862 A1 | 9/2010 | Nunnink | |
| 2010/0276493 A1 | 11/2010 | Havens | |
| 2010/0322612 A1 | 12/2010 | Tsuda | |
| 2011/0158634 A1 | 6/2011 | Craen | |
| 2011/0176221 A1* | 7/2011 | Tanaka | G02B 3/14 359/666 |
| 2011/0229840 A1 | 9/2011 | Liang | |
| 2011/0274372 A1 | 11/2011 | Bianchi | |
| 2012/0105707 A1 | 5/2012 | Futami | |
| 2012/0143004 A1 | 6/2012 | Gupta et al. | |
| 2012/0160918 A1* | 6/2012 | Negro | G06K 7/10722 235/455 |
| 2012/0200764 A1* | 8/2012 | Afshari | H04N 5/2254 348/345 |
| 2012/0261474 A1* | 10/2012 | Kawashime | G02B 3/14 235/462.24 |
| 2012/0261551 A1* | 10/2012 | Rogers | G02B 3/14 250/208.1 |
| 2012/0281295 A1 | 11/2012 | Jannard et al. | |
| 2013/0021087 A1 | 1/2013 | Rosset | |
| 2014/0183264 A1 | 7/2014 | Nunnink | |
| 2014/0268361 A1 | 9/2014 | Nunnink | |

FOREIGN PATENT DOCUMENTS

| | | |
|---|---|---|
| JP | H0527165 | 2/1993 |
| JP | 2004029685 | 1/2004 |
| JP | 2006520007 | 8/2006 |
| JP | 2009505543 | 2/2009 |
| JP | 2011218156 | 11/2011 |
| WO | 2004083899 | 9/2004 |
| WO | 2007020451 | 2/2007 |

OTHER PUBLICATIONS

Nunnink, "U.S. Appl. No. 14/139,867, Constant Magnification Lens for Vision System Camera", filed Dec. 23, 2013.

* cited by examiner

SYSTEM AND METHOD FOR REDUCTION OF DRIFT IN A VISION SYSTEM VARIABLE LENS

FIELD OF THE INVENTION

This application relates to cameras used in machine vision and more particularly to automatic focusing lens assemblies.

BACKGROUND OF THE INVENTION

Vision systems that perform measurement, inspection, alignment of objects and/or decoding of symbology (e.g. bar codes, or more simply "IDs") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader, the user or automated process acquires an image of an object that is believed to contain one or more IDs. The image is processed to identify ID features, which are then decoded by a decoding process and/or processor to obtain the inherent information (e.g. alphanumeric data) that is encoded in the pattern of the ID.

Often, a vision system camera includes an internal processor and other components that allow it to act as a standalone unit, providing a desired output data (e.g. decoded symbol information) to a downstream process, such as an inventory tracking computer system or logistics application.

An exemplary lens configuration that can be desirable in certain vision system applications is the automatic focusing (auto-focus) assembly. By way of example, an auto-focus lens can be facilitated by a type of "variable lens" assembly (defined further below), known as a so-called liquid lens assembly. One form of liquid lens, available from Varioptic of France uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. Relative to other auto-focus mechanisms, the liquid lens has extremely fast response times. It is also ideal for applications with reading distances that change from object-to-object (surface-to-surface) or during the changeover from the reading of one object to another object—for example in scanning a moving conveyor containing differing sized/height objects (such as shipping boxes). In general, the ability to quickly focus "on the fly" is desirable in many vision system applications.

A recent development in liquid lens technology is available from Optotune AG of Switzerland. This lens utilizes a movable membrane covering a liquid reservoir to vary its focal distance. A bobbin exerts pressure to alter the shape of the membrane and thereby vary the lens focus. The bobbin is moved by varying the input current within a preset range. Differing current levels provide differing focal distances for the liquid lens. This lens advantageously provides a larger aperture (e.g. 6 to 10 millimeters) than competing designs (e.g. Varioptic of France) and operates faster. However, due to thermal drift and other factors, there may be variation in calibration and focus setting during runtime use, and over time in general. A variety of systems can be provided to compensate and/or correct for focus variation and other factors. However, such compensation routines can require processing time (within the camera's internal processor) that slows the lens' overall response time in arriving at a new focus. Likewise, such compensation routines, (e.g. thermal drift) can be standardized, and not customized to the lens' intrinsics, rendering them less reliable for the specific drift conditions that a lens may encounter over time. Note that typical drift in a liquid lens is for example 0.15 Diopter/° C. (i.e. for the Varioptic liquid lens). Some vision applications, especially when small features at a large distance are to be detected, require a stability in optical power of the imager lens of +/−0.1 diopter.

Also it is recognized generally that a control frequency of at least approximately 1000 Hz may be required to adequately control the focus of the lens and maintain it within desired ranges. This poses a burden to the vision system's processor, which can be based on a DSP or similar architecture. That is, vision system tasks would suffer if the DSP were continually preoccupied with lens-control tasks. All of these disadvantages make drift compensation a challenge in many applications.

SUMMARY OF THE INVENTION

This invention overcomes disadvantages of the prior art by providing a vision system that is arranged to compensate for optical drift that can occur in certain lens assemblies capable of varying optical power, wherein the optical power (and hence, varying focal length/distance where focal length=1/optical power) is varied by controlling lens shape and/or lens refractive index. Such lens assemblies include, but are not limited to, liquid lens arrangements employing, for example, two iso-density fluids or a flexible membrane—also generally termed a "variable lens" assembly herein. The system includes an image sensor operatively connected to a vision system processor, and a variable lens assembly that is controlled (e.g. by the vision processor or another range-determining device) to vary a focal distance thereof. A positive lens assembly is configured to weaken an effect of the variable lens assembly over a predetermined operational range of the object from the positive lens assembly. The variable lens assembly illustratively comprises a liquid lens assembly, and such a liquid lens assembly can be inherently variable over approximately 20 diopter. Illustratively, the positive lens assembly and the variable lens assembly are collectively housed in a removable lens barrel with respect to a camera body and the image sensor. The image sensor is illustratively located within the camera body. Likewise, the vision processor can be all, or in part, located in the camera body. In an embodiment, the lens barrel has a C-mount lens base, and the positive lens assembly comprises a doublet, which includes a front convex lens and rear concave lens. The positive lens assembly can define an effective focal range of 40 millimeters. Illustratively, the usable focal length of the lens (e.g. a doublet) is between approximately 10 and 100 millimeters. Additionally, the variable lens assembly (e.g. liquid lens assembly) is typically located adjacent to, but remote from, a focal point of the positive lens assembly, which can be the front, or more typically, the back/rear focal point of the positive lens assembly. The distance between the variable lens assembly and the focal point can be between approximately 0.1 and 0.5 times a focal length F of the positive lens assembly. In this manner, the positive lens assembly and the variable lens assembly are part of an overall lens assembly focusing light on the image sensor. The optical power of the positive lens assembly, thus, "predominantly defines" an overall optical power of the overall lens assembly—in other words, the majority of magnification/optical power is provided by the positive lens assembly, thereby minimizing the effect of drift in the variable lens assembly.

BRIEF DESCRIPTION OF THE DRAWINGS

The invention description below refers to the accompanying drawings, of which.

DETAILED DESCRIPTION

Figure 1:
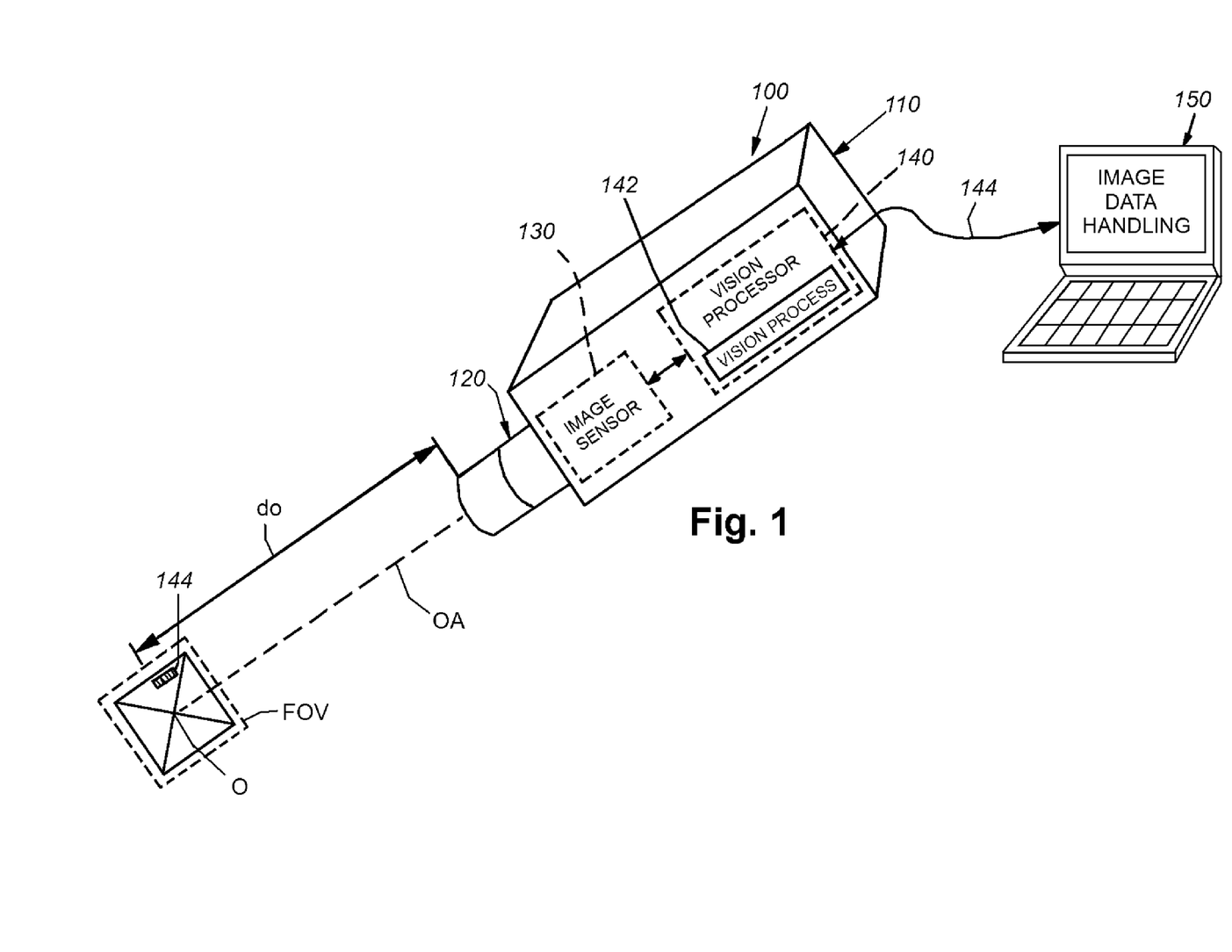
FIG. 1 is a diagram of an illustrative vision system arrangement having a vision system camera with associated vision processor, with a lens assembly that compensates for inherent drift over time, shown acquiring images of an exemplary object in a scene according to an illustrative embodiment.

FIG. 1 details a vision system 100 that includes a vision system camera assembly 110 and associated lens unit/assembly 120. The construction of the lens unit 120 is described further below. In an embodiment, the lens unit 120 is fixed to the camera, or can be removable using a custom or conventional mount base, such as the well known Cine or "C-mount". The camera includes a body/housing that can house a plurality of operational components including an image sensor or imager 130 (shown in phantom). In this embodiment, the imager 130 is operatively connected with an on-board vision processor 140 that operates a variety of hardware and/or software processes, generally termed a vision process 142. The vision process 142 can include a plurality of software applications that are adapted to perform general purpose or specialized vision system tasks, for example, ID (code) finding and decoding tasks, edge detection, blob analysis, surface inspection, robot manipulation and/or other operations. See, for example exemplary ID 144. The processes 142 can include various image acquisition and image manipulation applications as well—which place image data into a form more appropriate for use in vision system tasks—e.g. histogramming, thresholding, etc. These tasks and processes are known to those of skill in the art and can be sourced from a commercial vision system supplier—such as Cognex Corporation of Natick, Mass. As shown, the illustrative vision system processor 140 is contained within the camera body. Vision system data in "raw", pre-processed (e.g. found, undecoded ID image data), or fully processed (e.g. decoded ID data) form can be provided over a wired and/or wireless link 144 to an appropriate data-handling system or processor, such as a standalone PC or server system. Alternate systems, such as mobile computing devices, cloud-based devices, and the like can be provided in alternate implementations. The data-handling system stores and manipulates the image-based data as desired by the user—e.g. quality or inventory control. In alternate embodiments, some or all of the vision system processors/processes can be instantiated and/or performed in a remote processor (e.g. the computing device/processor 150) that is interconnected to the camera 110 by an appropriate wired and/or wireless link (e.g. link 144) in a manner known to those of skill in the art.

Note, as used herein, the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. In a system arrangement, such processes/process functions can be termed as occurring/existing in a corresponding "module" or "element". For example, an "ID-reading module", which performs the functions associated with reading and/or decoding of ID codes.

The lens assembly 120 is shown aligned along the optical axis OA (with the plane of the sensor 130) typically arranged perpendicularly to the axis. The lens assembly 120 and sensor 130 image an object O. The object O, by way of example, can be any two-dimensional (2D) or three-dimensional (3D) surface or shape that partially or fully fits within the field of view (FOV). In the depicted example, range/distance (do) of the object O from the camera 110 (e.g. from the focal plane of the sensor 130) can be varied, but defines a predetermined operating range (according to an illustrative embodiment) within which to image the object O.

Illustratively, this embodiment compensates for potential optical drift over time in a variable lens (e.g. a liquid lens) that is part of the overall lens assembly 120 by defining an operating range for the vision system at which the influence of the optical power of the variable lens on the optical power of the overall lens assembly (including any fixed lenses therein) is reduced. In this manner, drift is a small component of the overall focal performance of the lens assembly.

This illustrative arrangement provides benefits where the adjustable focus range can be reduced. Thus, this system is useful in various embodiments—such as those where the distance (do) of the object surface from the focal plane is relatively constant, or this distance (do) varies over a small relative distance. Illustratively, the system can be employed in vision system applications that read at larger distances, wherein the required optical range is only a small fraction (approximately 2 diopter) of the specified range of commercially available liquid lenses (20 diopter). As described above, the variable lens assembly of the embodiments contemplated herein can include a variety of lens types that are capable of varying optical power. More particularly, in embodiments, the optical power (and hence, varying focal length/distance where focal length=1/optical power) is varied by controlling the lens shape and/or the lens refractive index. Such variable lens assemblies include, but are not limited to, liquid lenses, and a variety of liquid lens types can be employed including iso-density fluid types (Varioptic), membrane types (Optotune), etc. Likewise, variable lenses that operate using other mechanisms, such as electromechanical actuation, can be employed.

Figure 2:
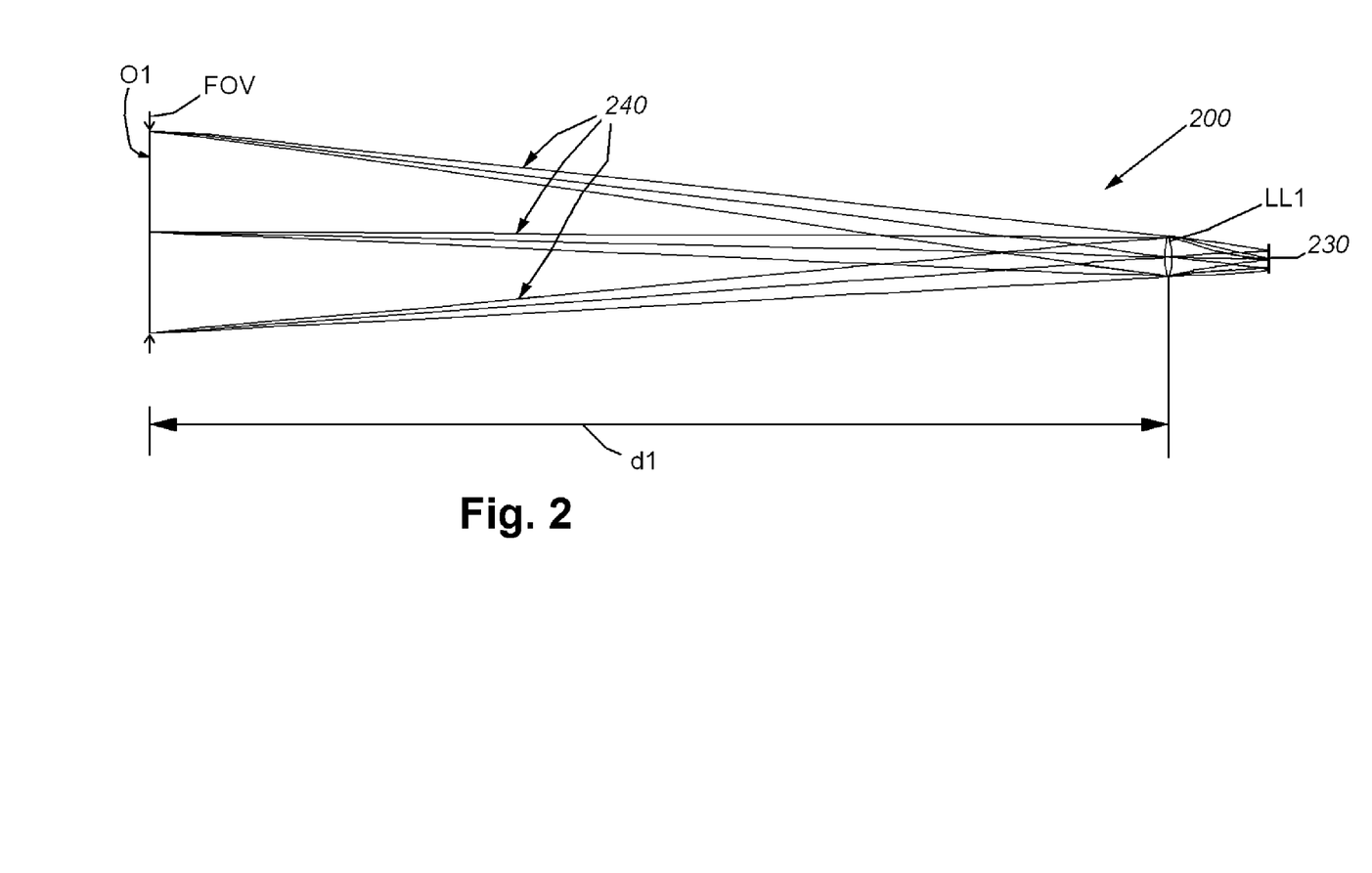
FIG. 2 is a diagram of the ray trace for an exemplary lens system that includes a variable lens assembly imaging an object.

By way of further illustration of the concepts of an embodiment, FIG. 2 depicts a ray trace diagram of a basic optics arrangement for an exemplary vision system 200 with an exemplary object O1, image sensor 230 and generalized variable lens (e.g. a liquid lens (LL1)). The object O1 is positioned at a distance d1 from the variable lens LL1. This system is free of additional lenses and the rays 240 reflected from the object O1 pass through the variable lens LL1 and are focused directly on the image sensor 130 as shown. Thus, any minor variation (for example, from drift) in the focus of the variable lens LL1 results in a potentially significant out-of-focus condition that can affect the ability of the vision system to render a proper result.

Figure 3:
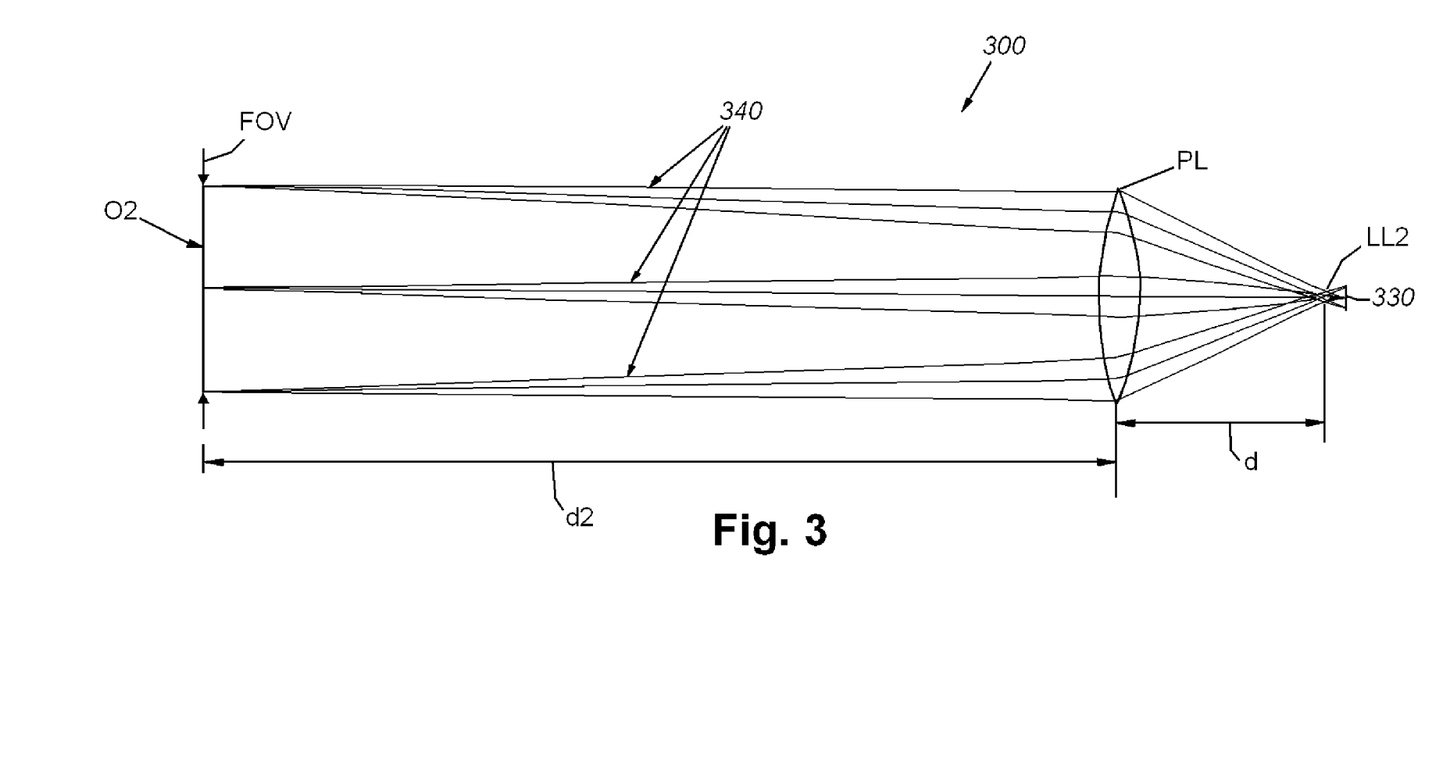
FIG. 3 is a diagram of the ray trace for an illustrative lens system including a variable lens assembly and a positive lens assembly is positioned along the optical axis at a predetermined distance from the variable lens assembly, to thereby provide a drift-tolerant lens system.

To address such sensitivity to drift and other focal variations in e.g. a liquid lens, reference is now made to FIG. 3, which shows a generalized optical arrangement for a vision system 300 according to an embodiment. A fixed (non-variable) positive lens PL is located at a predetermined distance d in front of the variable (e.g. liquid) lens assembly LL2, along the optical path between the system and imaged object O2.

Thus, the optical power A of this system 300 (where A1 is the optical power of the positive lens assembly PL, A2 is the optical power of the variable lens assembly LL2 and d is the distance between the positive lens PL and the variable lens LL2) is:

$$A=A1+A2-d*A1*A2$$

If the distance between the variable lens LL2 and the positive lens PL is relatively large, (e.g. d=k/A1 (where k=0.5 . . . 0.9, and represents the product of the power of the positive lens A1 and distance d; i.e. k=d*A1)), then the overall optical power A of the above-defined system of lenses with powers A1 and A2, and relative distance d can be written as:

$$A=A1+(1-k)*A2$$

and the drift, represented as a differential of lens optical power (dA) per unit time (dT) (dA/dT) of the system is:

$$dA/dT=dA1/dT+(1-k)*dA2/dT$$

meaning that the drift of the over system dA/DT equals the sum of the drift of the positive lens dA1/dT and (1−k) times the drift of the variable lens dA2/dT.

In an embodiment, the fixed positive lens PL can be chosen as a glass lens with inherently low drift (i.e. dA1/dT≈0), so compared to the original setup in FIG. 2, it follows that the overall drift dA/dT of the system of FIG. 3 is effectively reduced by a factor 1−k (=0.1× . . . 0.5×) using the positive lens PL, and the larger power the positive lens (i.e. larger k), the greater the drift reduction in the variable lens.

Figure 4:
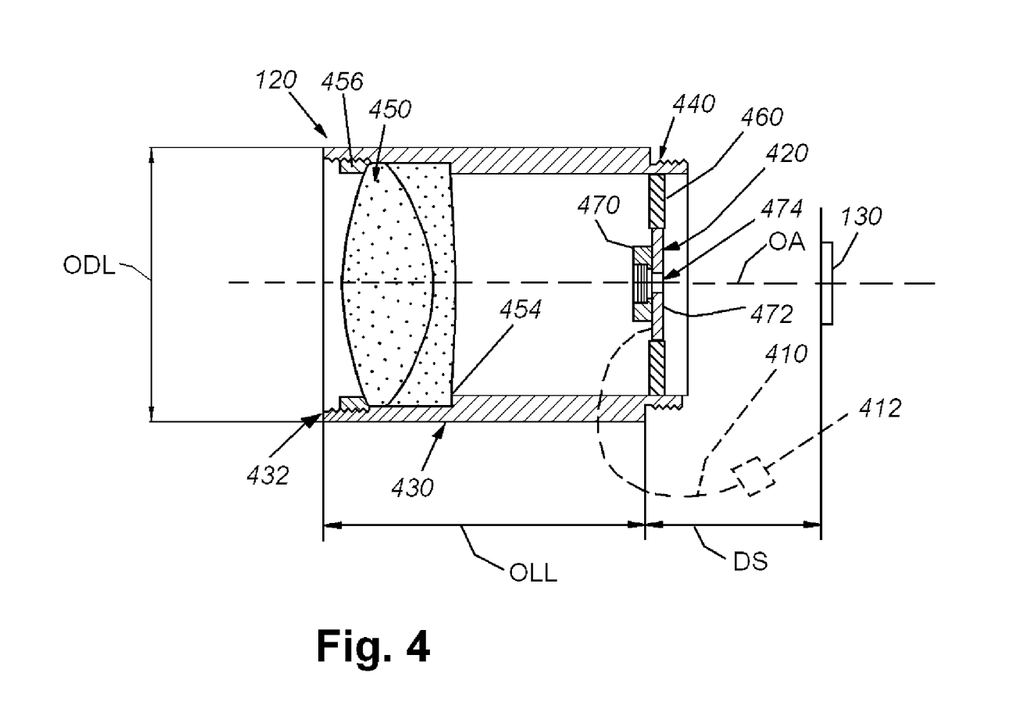
FIG. 4 is a side cross section of a lens unit including a variable lens assembly and positive lens exhibiting drift tolerance according to an illustrative embodiment, showing relative dimensions of the lens barrel and components associated therewith.

Reference is now made to FIG. 4, which details a cross section of an integrated lens unit/assembly 120 for use in the illustrative vision system camera 110 of FIG. 1. This lens assembly 120 can include various electrical connections and/or leads (shown schematically in phantom as cable 410 and connector 412) that extend from the variable (e.g. liquid) lens assembly 420 to a location on the body of the camera 110 in communication with appropriate control processors/components that are associated with the vision processor 140. Note that the exemplary liquid lens assembly 420, which can be a membrane-type, iso-density fluid-type or equivalent, is contained within a barrel 430 and the lead 410 is constructed to extend from a location on the barrel 430. This connection allows control signals to power the liquid lens assembly (e.g. current and/or voltage modulation) to enable the variation and setting of the focus of the liquid lens assembly 420 in response to commands of the processor. Proper focus can be determined and/or set using a variety of techniques known to those of skill—for example using the crispness of imaged edges after stepping through various focus settings and/or using an external range-finding device. While the use of a separate cable link, with associated connector on the body of the camera is employed in the depicted embodiment, the connection arrangement can be internal to the barrel 430—for example consisting of aligned contact pads and/or contact rings (on the lens and camera body) that interconnect when the lens assembly 120 is secured to the camera body.

The lens assembly barrel 430 is sized and arranged in this embodiment with the form factor of a conventional C-mount lens, having an appropriately threaded base 440. The depicted external thread of the barrel base (flange) 440 is adapted to mate with a corresponding internal thread (not shown) on the camera body. The thread size is conventional (e.g. 1 inch×32). Note that the camera body can include a variety of accessories and functional components, such as a ring illuminator surrounding the lens and/or connections for an external illumination assembly. Such accessories and/or components can be applied to the camera to accomplish specific vision system tasks. The barrel 430 can be constructed from a variety of materials such as cast or machined aluminum alloy. The threaded base allows the barrel, and associated overall lens assembly contained therein, to be removably attached to the camera body and replaced with other types of lenses at the option of either the manufacturer or user. While the form factor of a C-mount base is used in this embodiment, any acceptable lens base form that allows accommodation of a liquid lens or other appropriate variable lens can be employed in alternate embodiments. For example, an F-mount lens base can be employed.

The dimensions of the lens barrel 430 are shown by way of non-limiting example in FIG. 4. As depicted, the barrel outer diameter ODL can be approximately 28-29 millimeters in an embodiment. This addresses the general size constraints/parameters of a C-mount lens. Likewise, the length OLL of the barrel 430 from front end 432 to the threaded base 440 is illustratively, approximately 32-34 millimeters. The distance DS from the lens base 440 to the focal plane of the image sensor 130 is approximately 17.5 millimeters.

Note that these dimensions are illustrative of a wide range of possible relationships that are known to those of skill.

Figure 4A:
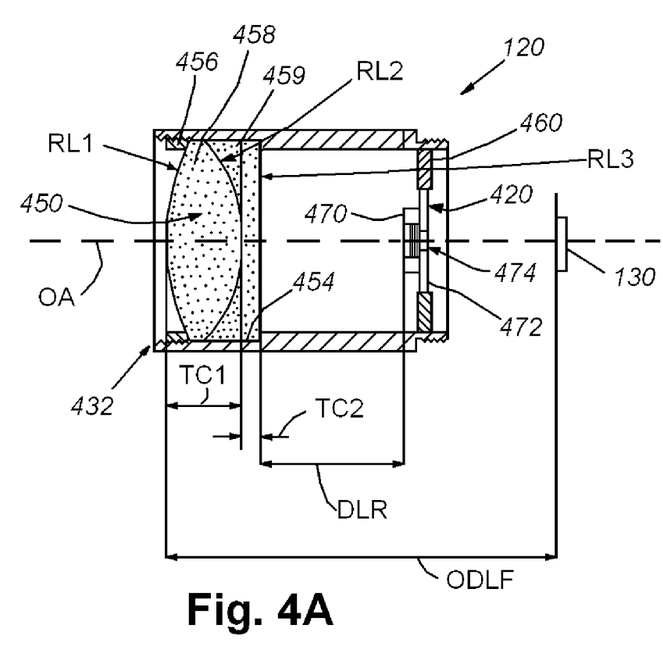
FIG. 4A is a side cross section of the lens unit of FIG. 4, showing the relative placement of components along the optical axis.

With further reference to FIG. 4A, the positioning of the internal optical components of the lens is described in detail. A positive lens assembly 450, having a relatively large diameter with respect to the variable lens (420) diameter, is located adjacent to the front end 432 of the barrel 430. This positive lens assembly (also termed the "positive lens") 450 is seated within a recess 454 formed at the front end of the barrel. The positive lens 450 is secured at its front side by a threaded ring 456. Note that this arrangement is highly variable in alternate embodiments, and a variety of mounting and/or attachment mechanisms can be employed in alternate embodiments. The positive lens 450 is an achromatic doublet, defining an effective focal length (f) of 40 mm and a back focal length of 33.26 millimeters. The clear aperture is 24 millimeters. The overall lens assembly diameter is 25 millimeters. Illustratively, it consists of a front, convex lens 458 and a rear, concave lens 459. The convex lens 458 defines a front radius RL1 of 27.97 millimeters and rear radius RL2 of −18.85 millimeters (where positive and negative radii represent directions with respect to the orientation of the imaged object, with positive radii oriented toward the object and negative radii oriented toward the image sensor). The concave lens 459 defines a front radius (also RL2) of 18.85 millimeters (complimenting the mating surface of the convex lens 458) and a rear radius RL3 of 152.94 millimeters. The convex lens 458 has a center thickness TC1 (along the optical axis OA) of 9.5 millimeters and the concave lens has a center thickness TC2 of 2.5 millimeters. These dimensions are highly variable in alternate embodiments. The above-described embodiment and associated dimensions of a positive lens (e.g. doublet) assembly 450 is commercially available from Edmund Optics Inc. of Barrington, N.J. as stock number 32321. In this embodiment, the lens front-to-sensor plane distance ODLF is approximately 49 millimeters according to an embodiment. It should be clear that the positive lens' dimensions and/or the arrangement of components are highly variable in alternate embodiments.

The variable (e.g. liquid) lens assembly (which can be sourced from a variety of manufacturers) 420 is positioned adjacent to the rear end of the lens barrel 430. In this embodiment, and by way of non-limiting example, the variable lens assembly 420 can comprise a model Arctic 416 liquid lens available from Varioptic of France. The exemplary variable lens assembly has a focus range of approximately 20 diopter (i.e. 5 centimeters to infinity), a diameter of 7.75 millimeters and a thickness (along the optical axis) of 1.6 millimeters. The depicted, exemplary, liquid lens assembly 420 consists of the lens unit 470, which is mounted on a controller circuit board 472, having a central aperture 474, aligned along the optical axis through which focused light passes onto the sensor 130.

The lens assembly 130 can be supported within the barrel 430 using an integral or unitary spacer, shoulder arrangement and/or support structure 460. The support structure 460 ensures that the variable lens assembly 420 remains fixed in an appropriate alignment with respect to the optical axis OA. The distance DLR from the positive lens rear to the front of the variable lens unit 470 is 18.0 millimeters in this embodiment. Note that the image sensor 130 can define a conventional ½ inch-size CMOS sensor (6.9 millimeters (horizontal) by 5.5 millimeters (vertical)—SW in FIG. 5) in an embodiment.

Figure 5:
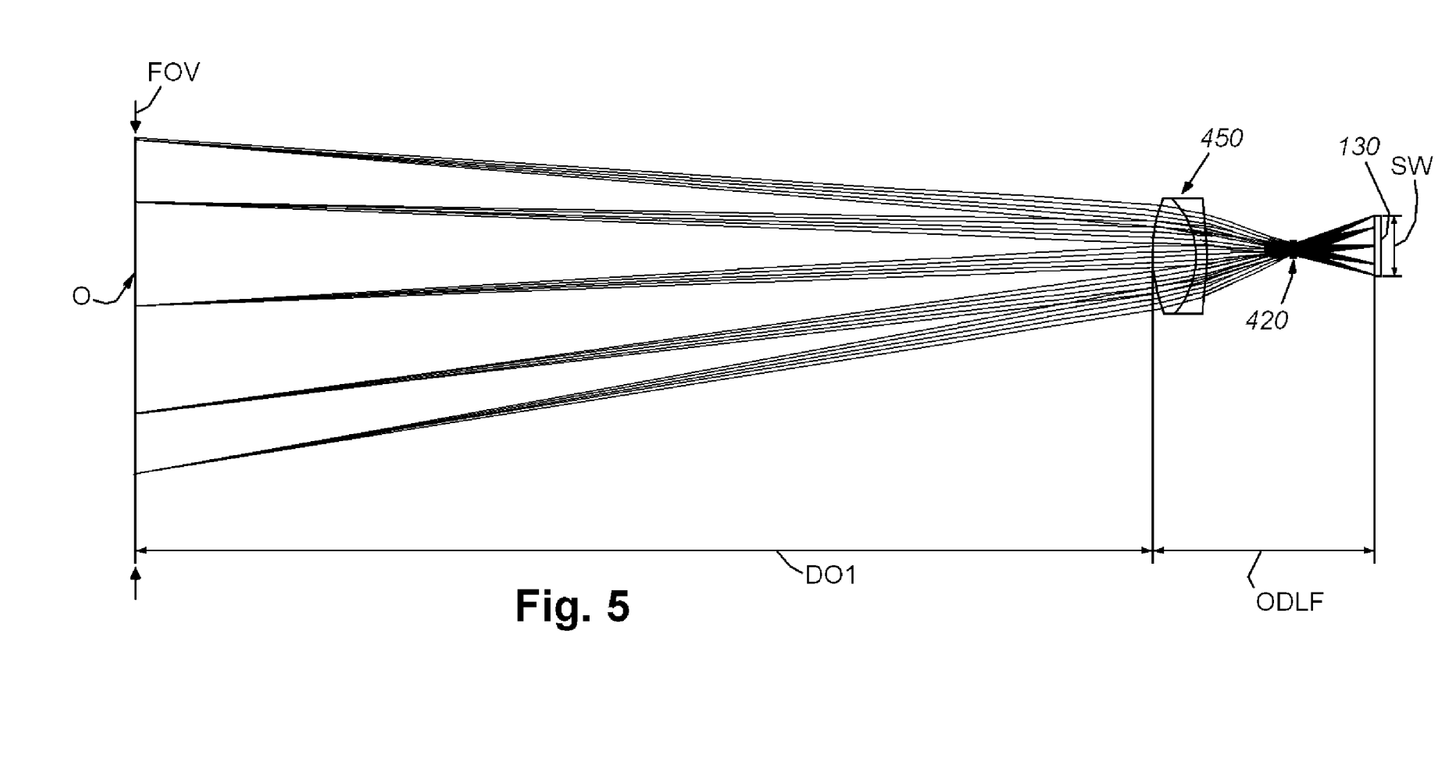
FIG. 5 is a diagram of the ray trace for the illustrative lens unit of FIG. 4, shown imaging an object at a first distance.
Figure 6:
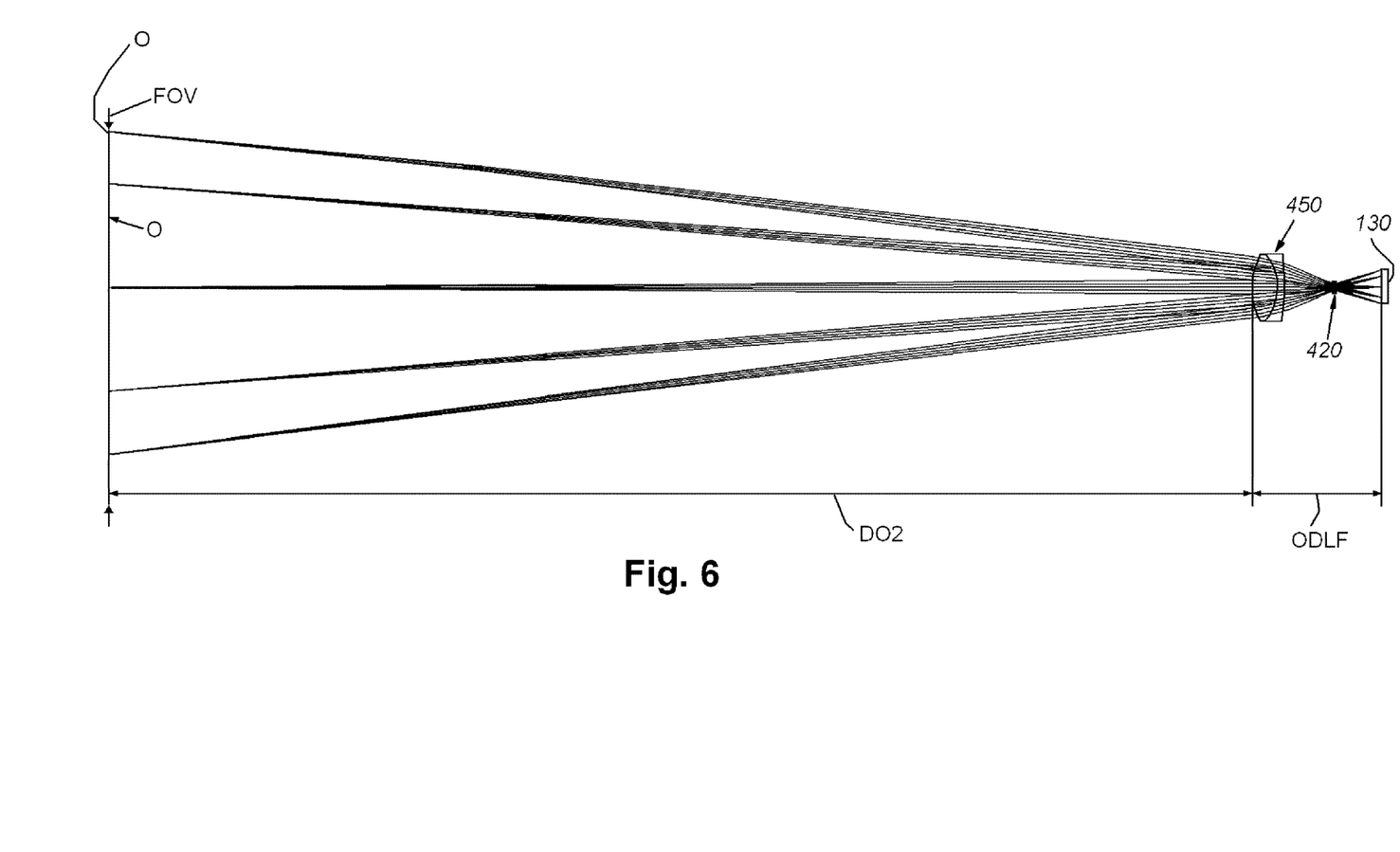
FIG. 6 is a diagram of the ray trace for the illustrative lens unit of FIG. 4, shown imaging an object at a second distance, longer than the first distance.
Figure 7:
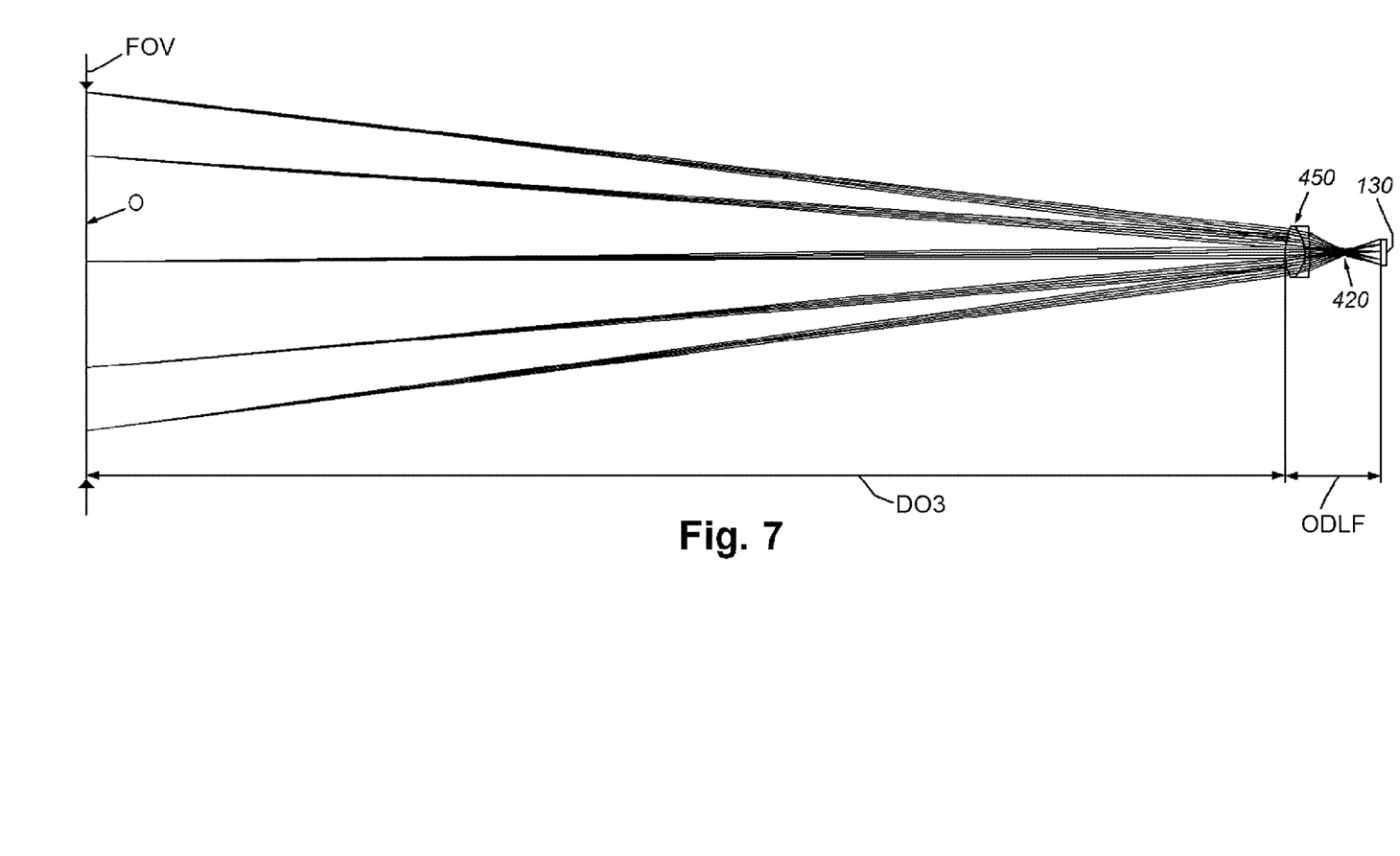
FIG. 7 is a diagram of the ray trace for the illustrative lens unit of FIG. 4, shown imaging an object at a first distance.

Reference is now made to FIGS. 5-7, which show the vision system and lens assembly in operation at a plurality of focal distances within the operational range of the system. The object O is thus located at three exemplary distances DO1, DO2 and DO3 in each of ray trace diagrams of FIGS. 5, 6 and 7, respectively. By way of example DO1 is approximately 219 millimeters, DO2 is approximately 430 millimeters, and DO3 is approximately 635 millimeters. Within this range, the optical power of the variable lens assembly is varied from +10.73 diopter for F=37.4 millimeters (FIG. 5); to +0.32 diopter for F=39.8 millimeters (FIG. 6); to −3.81 diopter for F=42.3 millimeters. This 219 to 635-millimeter focal range is associated with a 6.9 diopter variation. By way of comparison, a system mounting with the depicted variable lens assembly in a conventional arrangement with the variable lens attached at close distance of the front lens typically requires a 3.3 diopter variation. Thus, the illustrative system effectively reduces potential drift by more than a factor of 2 relative to a conventional arrangement.

Figure 8:
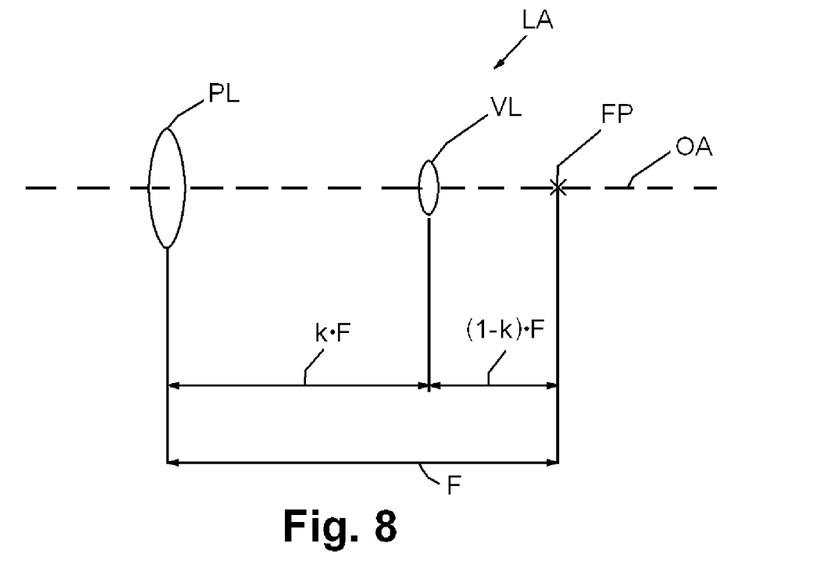
FIG. 8 is a diagram of the relationship between the positive lens assembly, variable lens assembly and positive lens focal point according to embodiments herein.

More generally, the variable lens assembly (e.g. liquid lens assembly) is located adjacent to, but remote from, a focal point of the positive lens assembly, which can be the front, or more typically, the back/rear focal point of the positive lens assembly. It is understood that the positioning adjacent to the focal point allows for the variable lens to contribute to the total power of the lens system. The distance between the variable lens assembly and the focal point can be between approximately 0.1 and 0.5 times a focal length F of the positive lens assembly. By way of illustration, reference is made to the diagram of FIG. 8, where a positive lens assembly PL is positioned along the optical axis OA with a variable lens VL adjacent to the positive lens focal point FP. The focal length F between the positive lens PL and focal point FP is depicted. The distance (1−k)*F is characterized as the distance between the variable lens VL and the focal lens and the focal point FP with k=0.9 to 0.5 (i.e. 0.9*F to 0.5*F). Thus, the distance between the positive lens PL and the variable lens VL is k*F (i.e. 0.1*F to 0.5*F). In this manner, the positive lens assembly PL and the variable lens VL assembly are part of an overall lens assembly LA focusing light on the image sensor, and the optical power of the positive lens assembly "predominantly defines" an overall optical power of the overall lens assembly—in other words, the majority of magnification/optical power is provided by the positive lens assembly, thereby minimizing the effect of drift in the variable lens assembly.

It is also contemplated that the drift-compensating lens arrangement of the embodiments herein can be employed in combination with other drift-reducing methods, such as temperature stabilization of the variable lens or optical feedback systems. By way of non-limiting example, and incorporated herein by reference as useful background information, such arrangements are shown and described in commonly assigned U.S. patent application Ser. No. 14/139,867, entitled CONSTANT MAGNIFICATION LENS FOR VISION SYSTEM CAMERA, by Nunnink; U.S. patent application Ser. No. 13/800,055, entitled LENS ASSEMBLY WITH INTEGRATED FEEDBACK LOOP FOR FOCUS ADJUSTMENT, by Nunnink et al.; and U.S. Pat. No. 8,576,390; entitled SYSTEM AND METHOD FOR DETERMINING AND CONTROLLING FOCAL DISTANCE IN A VISION SYSTEM CAMERA, by Nunnink.

It should be clear that the above-described embodiments, provide a system that is particularly useful for imaging a small feature (or feature set), such as an ID code, over a relatively large distance. The effect of the variable lens assembly is weakened using the positive lens assembly according to an embodiment. This arrangement is acceptable within the desired operational range and feature size.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Also, while the depicted lens assembly is incorporated in a removable lens unit, it is contemplated that the system can be employed in a fixed and/or permanently mounted lens. Likewise, while the above-described lens sizes and spacing distances are employed for the exemplary operational range, such sizes and distances can be scaled upwardly or downwardly in arrangements that have similar relative parameters but a larger or smaller overall size. Additionally, where a "lens assembly" is employed and/or described herein, it can consist of one or more discrete lenses that provide a desired optical effect. Accordingly, this description is meant to be taken only by way of example, and not to otherwise limit the scope of this invention.

What is claimed is:

1. A vision system that compensates for an effect of drift in a variable lens assembly comprising:
    an image sensor operatively connected to a vision system processor;
    a variable lens assembly that varies a shape or a refractive index thereof; and
    a positive lens assembly configured to weaken an effect of the variable lens assembly over a predetermined operational range of the object from the positive lens assembly,
    wherein the variable lens assembly is located adjacent to a focal point of the positive lens assembly and a distance between the variable lens assembly and the focal point of the positive lens assembly is between 0.2 and 0.5 times a focal length of the positive lens assembly, and
    wherein the positive lens assembly and the variable lens assembly are part of an overall lens assembly focusing light on the image sensor and an optical power of the positive lens assembly predominantly defining an overall optical power of the overall lens assembly thereby compensating for the effect of drift in the variable lens assembly.

2. The vision system a set forth in claim 1 wherein the variable lens assembly comprises a liquid lens assembly.

3. The vision system as set forth in claim 2 wherein the liquid lens assembly is variable over approximately 20 diopter.

4. The vision system as set forth in claim 1 wherein the positive lens and the variable lens are housed in a removable lens barrel with respect to a camera body and the image sensor, the image sensor being located within the camera body.

5. The vision system as set forth in claim 4 wherein the lens barrel has a C-mount lens base.

6. The vision system as set forth in claim 4 wherein the positive lens comprises a doublet including a convex lens and concave lens.

7. The vision system as set forth in claim 6 wherein the positive lens defines effective usable focal range of between approximately 10 and 100 millimeters.

8. The vision system as set forth in claim 1 wherein the focal point is one of either a front focal point or a back focal point of the positive lens assembly.

9. The vision system as set forth in claim 1 wherein the variable lens assembly comprises a liquid lens assembly.

10. The vision system as set forth in claim 1, wherein an overall drift of the vision system is effectively reduced by a factor of 1−k, where k is between 0.8 and 0.5.

11. A variable lens system that compensates for an effect of drift in a variable lens assembly for a vision system having an image sensor that transmits image data to a processor comprising:
    a variable lens assembly; and
    a positive lens assembly,
    wherein the variable lens assembly is located adjacent to a focal point of the positive lens assembly and a distance between the variable lens assembly and the focal point of the positive lens assembly is between 0.2 and 0.5 times a focal length of the positive lens assembly thereby compensating for the effect of drift in the variable lens assembly.

12. The lens system a set forth in claim 11 wherein the variable lens assembly comprises a liquid lens assembly.

13. The lens system as set forth in claim 12 wherein the liquid lens assembly is variable over approximately 20 diopter.

14. The lens system as set forth in claim 11 wherein the positive lens assembly and the variable lens assembly are housed in a removable lens barrel with respect to a camera body and the image sensor, the image sensor being located within the camera body.

15. A variable lens system that compensates for an effect of drift in a variable lens assembly for a vision system having an image sensor that transmits image data to a processor comprising:
    a variable lens assembly; and
    a positive lens assembly having a focal point, the variable lens assembly being located adjacent to the focal point,
    wherein the positive lens assembly and the variable lens assembly are part of an overall lens assembly focusing light on the image sensor and an optical power of the positive lens assembly predominantly defining an overall optical power of the overall lens assembly, and
    wherein the variable lens assembly is located adjacent to a focal point of the positive lens assembly and a distance between the variable lens assembly and the focal point of the positive lens assembly is between 0.2 and 0.5 times a focal length of the positive lens assembly thereby compensating for the effect of drift in the variable lens assembly.

16. The lens system a set forth in claim 15 wherein the variable lens assembly comprises a liquid lens assembly.

17. The lens system as set forth in claim 16 wherein the liquid lens assembly is variable over approximately 20 diopter.

18. The lens system as set forth in claim 15 wherein the positive lens and the variable lens are housed in a removable lens barrel with respect to a camera body and the image sensor, the image sensor being located within the camera body.

* * * * *